United States Patent [19]

Sechet et al.

[11] 4,426,684

[45] Jan. 17, 1984

[54] SCRATCH PAD MEMORY FOR CASSETTE OF MAGNETIC TAPE RECORDING

[75] Inventors: Claude Sechet, Rennes; Christian Gautier, Acigne; Gabriel Degoulet, Goven, all of France

[73] Assignees: Etablissement Public de Diffusion dit "Telediffusion de France"; L'Etat Francais, represente par le Secretaire d'Etat aux Postes et Telecommunications et a la Telediffusion (Centre National d'Etudes des Telecommunications), France

[21] Appl. No.: 166,243

[22] Filed: Jul. 7, 1980

[30] Foreign Application Priority Data

Jul. 9, 1979 [FR] France .................. 79 18180

[51] Int. Cl.³ .......................................... G06F 3/14
[52] U.S. Cl. ........................... 364/900; 340/706
[58] Field of Search .......... 364/200 LMS, 900 LMS, 364/200 MS File, 900 MS File, 900

[56] References Cited

U.S. PATENT DOCUMENTS

| 4,100,607 | 7/1978 | Skinner | 364/900 |
|---|---|---|---|
| 4,114,026 | 9/1978 | Fiorenza | 364/900 |
| 4,115,846 | 9/1978 | Laine | 364/200 |

Primary Examiner—Felix D. Gruber
Attorney, Agent, or Firm—Laff, Whitesel, Conte & Saret

[57] ABSTRACT

The invention relates to a scratch pad memory system having a table of contents for identifying program material recorded on a magnetic tape in a cassette or cartridge with program material being recorded or changed responsive to user command. The scratch pad memory system comprising an address register, a read only storage, and having an interface for read/write storage and a text displaying terminal coupled to a television receiver for display of program material.

7 Claims, 6 Drawing Figures

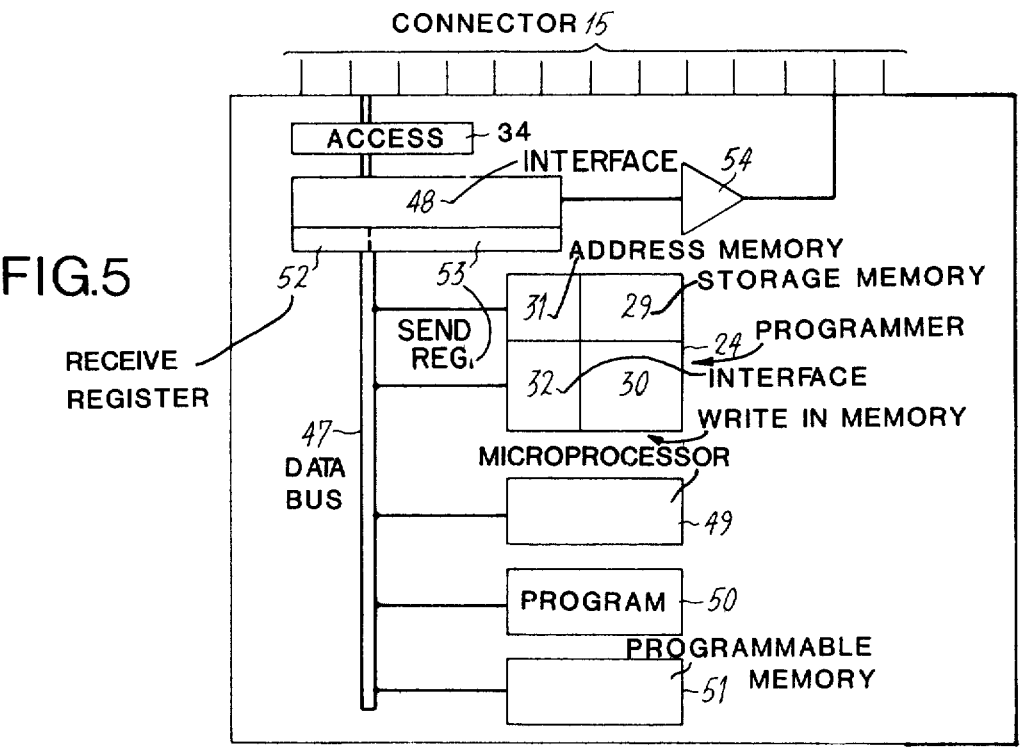

SCRATCH PAD MEMORY FOR CASSETTE OF MAGNETIC TAPE RECORDING

The present invention relates to a scratch pad memory, or electronic table of contents, especially for cassettes containing magnetic tapes for the recording of sounds or of images, or more generally speaking, cassettes with evolutional content.

At present, in order to identify the content of the magnetic recording of a cassette, a label is used which bears the necessary indications, which indications may be modified as needed. Those labels do not make possible an automatic management of the filing, nor do they make it possible to deliver instruction for the management of the tape reading-recording device. Now, the recent technology of magnetic recording makes possible the long recordings, of 2 to 4 hours, of television programs on a single tape; hence, there is a greater difficulty in managing such a recording.

One object of the present invention comprises providing, in association with each cassette, an electronic memory means for a memory which can be erased and re-written. These means are part of the cassette, the means being connected to a reading-writing circuit as soon as the cassette is introduced either into a storage apparatus or into a reading-recording device for magnetic tapes.

According to a characteristic of the present invention, a scratch pad memory comprises a first read only memory accessible through an address register, a first permanent memory which can be re-inscribed and which is accessible through a first interface, and a first bus making it possible to connect the register or first interface to a terminal which comprises a character generator connected to a page memory to be displayed, the output of the character generator being connected to a TV set, the terminal further comprises a second interface which can be connected to said first bus by suitable selection means, a third interface connected to said second interface on one side and to the page memory on the other side. The second interface is further connected to an address counter controlled by a circuit which is capable of decoding the addresses delivered by the counter and, as a function of the decoding, to order the counter to perform pre-determined address jumps.

According to another characteristic, the scratch pad memory comprises a microprocessor with a central unit, a second read only memory and a first ram memory. A fourth interface is connected between the first bus and a second bus connected to the second interface. The microprocessor is capable, as a function of the data received in the fourth interface, of reading the data in the first read only memory or in the first permanent memory which can be re-written, and to have those data recorded in the fourth interface for transmission to the terminal.

The characteristics of the present invention which have been indicated above, as well as others, will appear more clearly upon a reading of the following description of embodiments. The description being made with reference to the attached drawings, among which:

FIG. 5 is a block diagram of an alternative of the scratch pad memory in FIG. 3;

FIG. 6 is a schematic perspective view of a videocassette, equipped with a scratch pad memory, ready to be assembled in a magnetic recorder.

Figure 1:
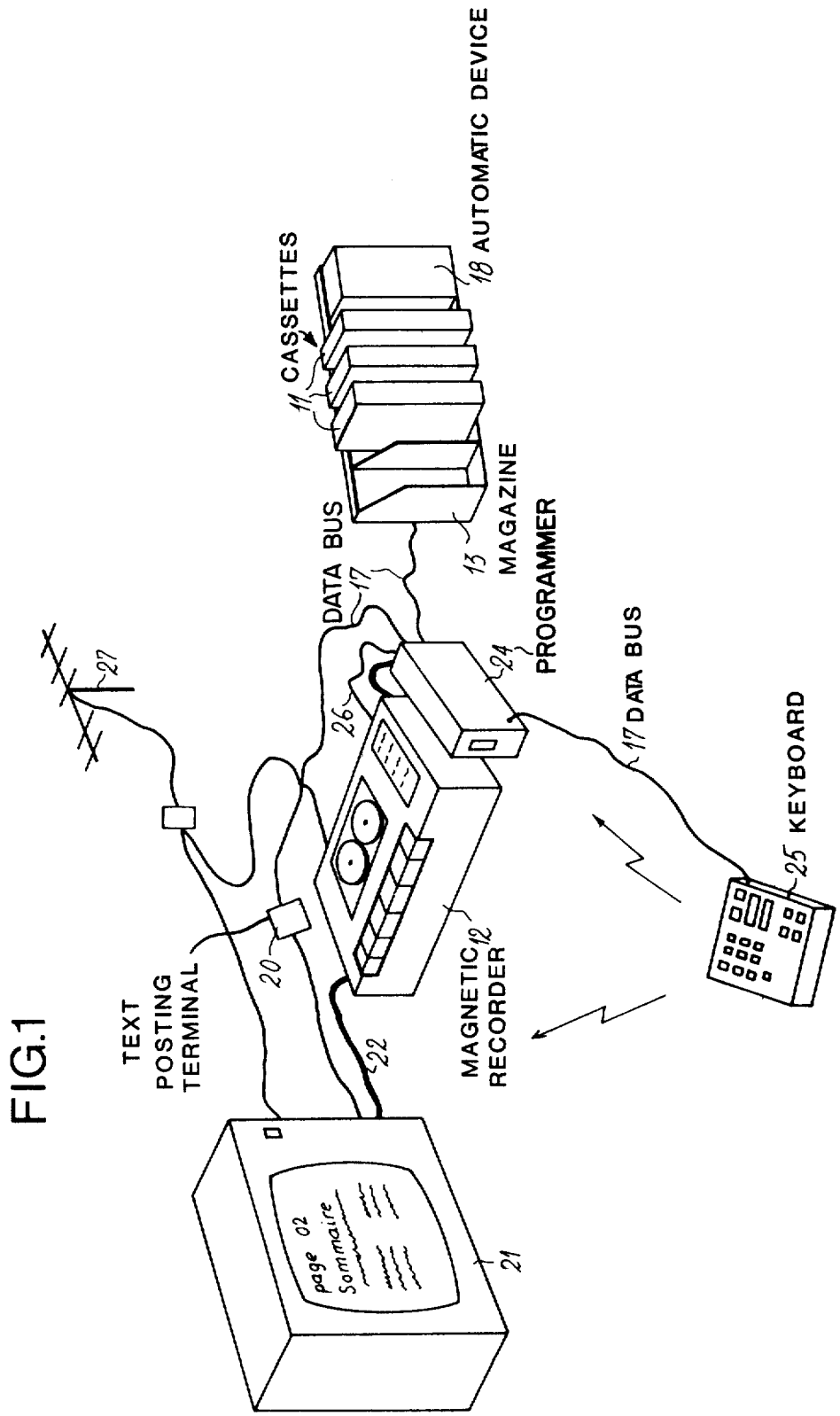
FIG. 1 is a schematic view of an assembly or group of apparatus which make possible the use of a scratch pad memory, according to the invention, in association with the magnetic tape cassette.
Figure 2:
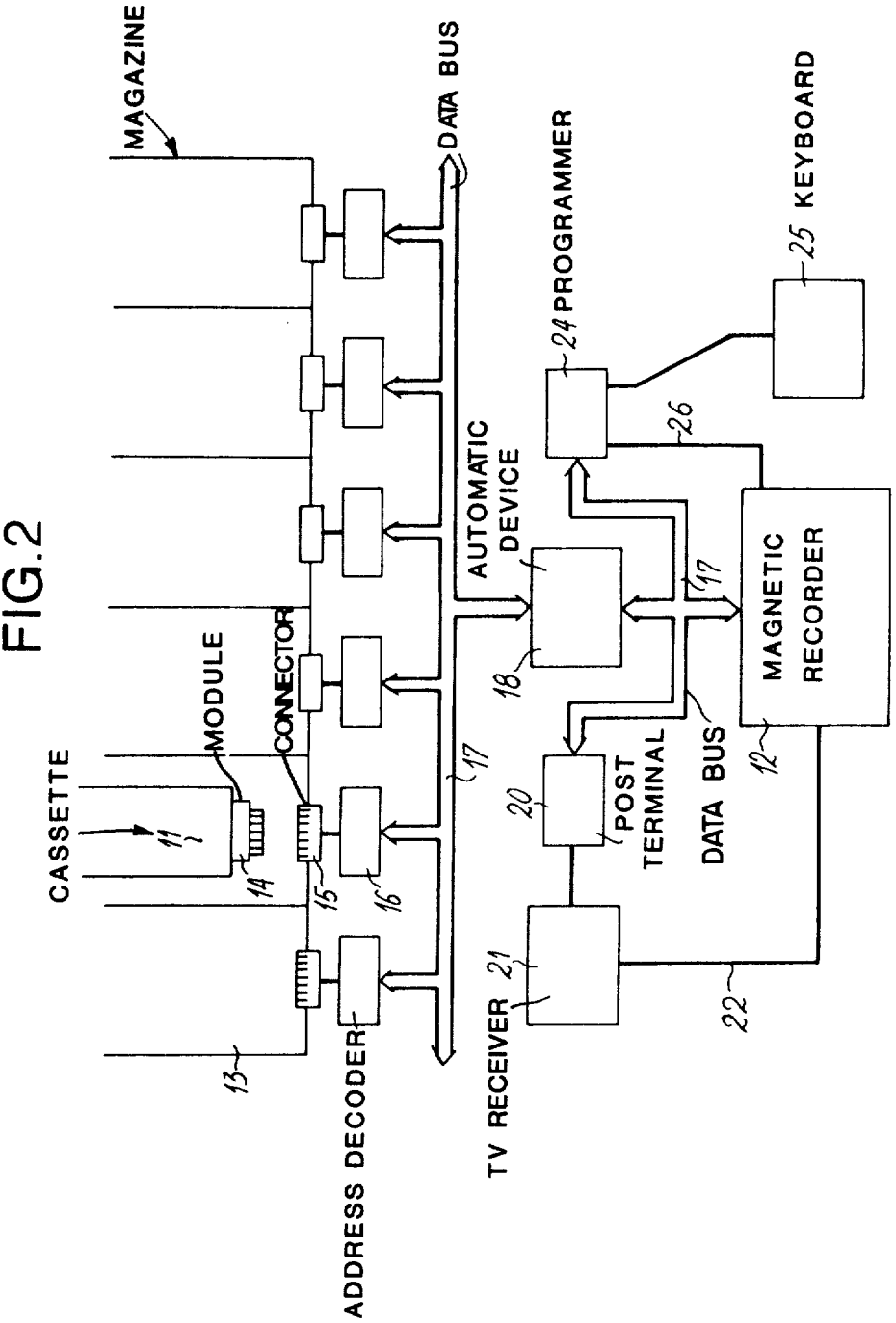
FIG. 2 is a block diagram of an automatic device which is part of the assembly or group of the apparatus in FIG. 1, and of its connection with the other apparatuses.

In FIG. 1, there have been symbolically represented cassettes 11 which contain magnetic tapes used with a magnetic recorder 12. Each cassette 11 is stored in a cell of a cassette magazine 13. Each cassette 11 is stored in a cell of a cassette magazine 13. Each cassette 11 comprises a module 14 which can be pluggable and is seen in FIGS. 2 and 6, which is part of the casing of the cassette. When cassette 11 is stored in magazine 13, its module 14 is plugged into a connector 15 of the magazine, the connection wires of which are respectively connected to an address decoding circuit 16, itself connected by a data bus 17 to an automatic device 18. The automatic device 18, in FIG. 1, may further be connected, through data bus 17 to another address decoding device, not represented, located in the magnetic recorder 12, to cooperate with the module of the cassette which, possibly, is located in the magnetic recorder. It is also connected, through data bus 17 to a test-displaying teletext terminal 20 associated with the television receiver or scanner 21. Magnetic recorder 12 also is connected to television receiver or scanner 21 by means of a conventional video cable 22. Automatic device 18 is further connected, through bus 17 to a programmer 24 associated with a governing or controlling keyboard 25. Programmer 24 is connected to the magnetic recorder 12 by a connection 26. Finally, television set 21 and magnetic recorder 12 are normally connected by UHF cables to a reception antenna 27 (FIG. 1).

Preferably, hereafter, it will be assumed that the teletext displaying terminal 20 is a terminal working according to the "ANTIOPE" system, described in the French Patent Application entitled "Improvements In The Systems Of Transmission And Of Text Posting On A Television Screen", filed by "Telediffusion de France" and "L'Etat Francais" on Sept. 22, 1976, under national registration No. 76 29034 (U.S. application Ser. No. 833,157, filed Sept. 14, 1977—Now U.S. Pat. No. 4,213,124, dated July 15, 1980). As described in this application, the page date to be displayed on a television screen is transmitted octet by octet (an "octet" or "byte" is an 8-bit word). The succession of the octets transmitted comprises, in addition to the octets of data to be displayed, or character octets, row flags, followed by row numbers, escape octets followed by model identity octets, followed by a sequence of characters to be displayed following the same model.

In addition, automated TV program recording device 24 preferably is a programmer of the "EPEOS" system which is described in the technical article entitled "EPEOS", "Automatic Program Recording Service", by C. Gautier, C. Degoulet et G. Gaucher, and which appeared in the French technical journal "Eadiodiffusion Television", No. 40, November-December 1975-5/5, Pages 31 to 36.

Module 14 contains a scratch pad memory, according to the invention. Below, there will first be considered the means which are used to read the information recorded in the scratch pad memory, as well as their functioning, before later describing the writing of the information in said scratch pad memory. It should be remembered that the data recorded into that memory are data compatible with the ANTIOPE teletext system, already indicated, that is to say, they comprise not only the character octets, but also the flag and escape octets.

The block diagram in FIG. 2 shows how the different apparatuses are connected around automatic device 18.

Figure 3:
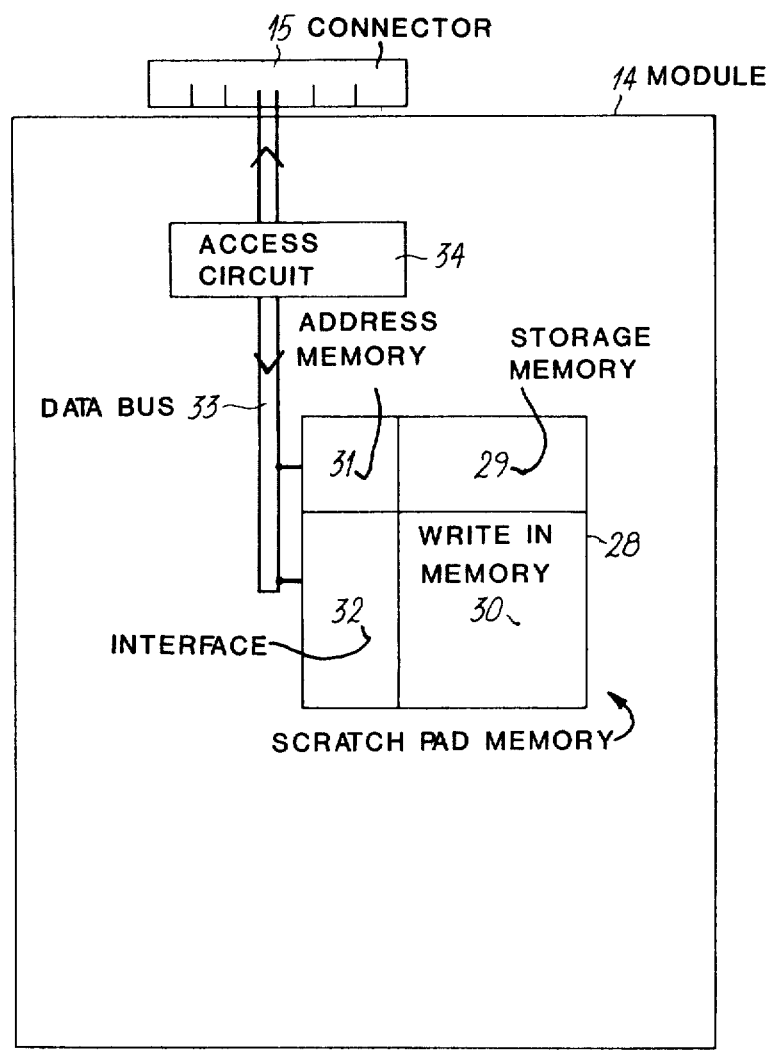
FIG. 3 is a block diagram of a scratch pad memory, according to the present invention.

The scratch pad memory in FIG. 3 comprises a memory 28 which, in practice, includes an archive or read only storage memory 29, a read/write memory 30 which can be re-written, an address register 31 and an interface 32. Register 31 and interface 32 are connected to data bus 33 which is itself connected to a conditional access circuit 34. Circuit 34 is connected to connector 15.

The pins of connector 15 bring to memory 28 the signals and the feeding voltage which are indispensible to its operation. They send toward automatic device 18 the reading signals which it may request. The archive of read only memory 29 contains invariable information relative to the identity of module 14, which is constituted by a card on which are mounted the components 28, 33 and 34, as well as connector 15. The card is mounted on a cassette 11, the content of which has to be controlled. Memory 29 also contains other data information or program characteristics such as the origin, the manufacturer, the year of fabrication, the dimensions, the content, the storing position, the information visualization format, etc.

Memory 30, which can be re-written, contains the various information relative to the present state of the content of the associated cassette, such as the list of the sequences recorded on the magnetic tape of the cassette, so as to form a summary which comprises:
 the order numbers of the recordings,
 the titles,
 the recording positions in values displayed along the tape, (i.e. in terms of "footage"),
 the recording characteristics, such as a use identification code,
 the duration of the recordings, indicated in hours and minutes, the possible restrictions upon recording and, in this respect, any code word which may be required by the terminal.

The use of identification codes has been mentioned in the above identified technical articles relating to the EPEOS system.

Figure 4:
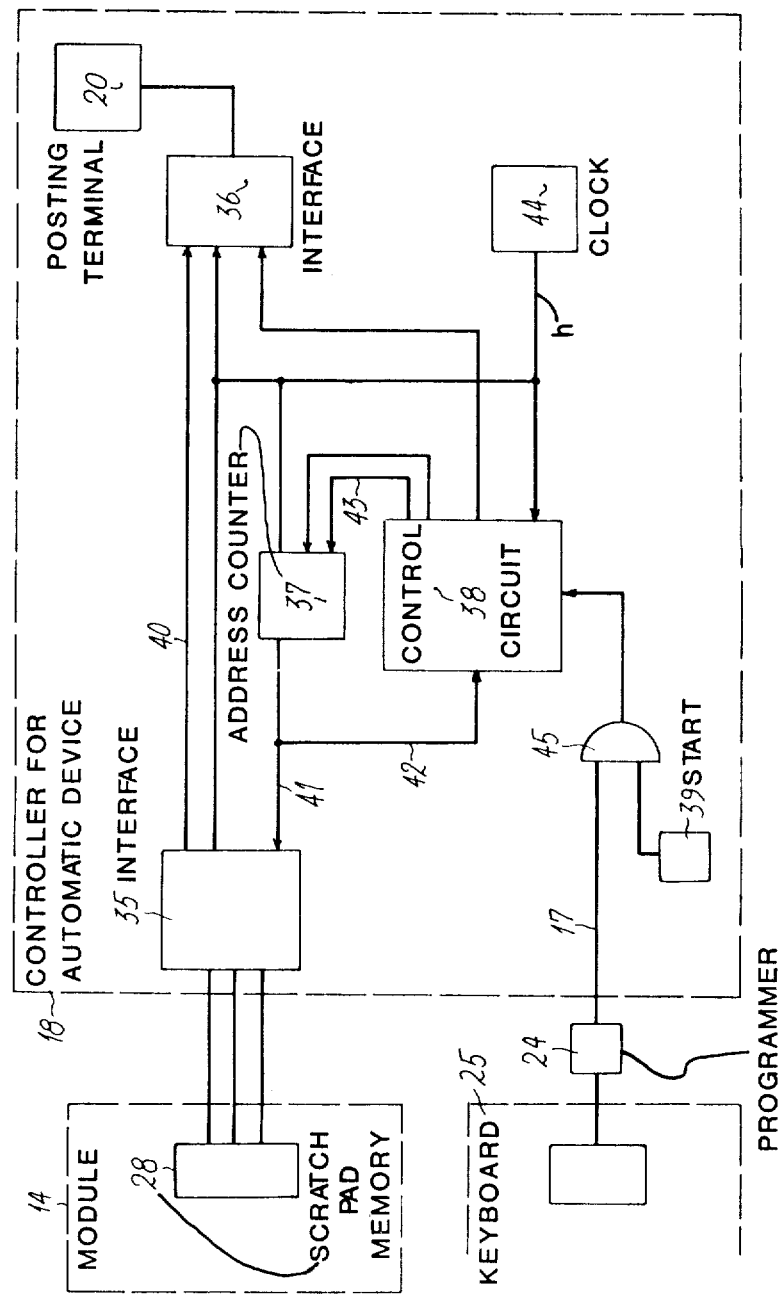
FIG. 4 is a block diagram of the reading circuits of the automatic device in FIG. 2, capable of reading the content of the scratch pad memory in FIG. 3.

The diagram in FIG. 4 shows the governing or control circuits of the automatic device 18, which make it possible to record a numerical sequence which the ANTIOPE posting terminal 20 can interpret as a summary page of scratch pad memory 28. They (the controlling circuits) comprise an electrical and logical adaptation interface 35 which executes the necessary adaptations to have a dialogue with scratch pad memory 28. An interface 36 sends the adaptations toward terminal 20. An address counter 37 performs the necessary jumps of the addresses to be transmitted to scratch pad memory 28. A control circuit 38 and a starting button 39 complete the control circuits of FIG. 4. Interfaces 35 and 36 are joined by data bus 40. Counter 37 is connected, in parallel, on one side to interface 35 through connection 41, and on the other side, to control circuit 38 through connection 42. Controlling circuit 38 is further connected to counter 37 by a connection 43, via wire h (FIG. 4). A clock 44 delivers the clock pulse signals to the different circuits. Finally, keyboard member 25 is connected, through programmer 24 and magnetic recorder 12, to an input of an OR gate 45 of automatic interface 18. The second input of OR gate 45 is connected to the starting button 39 and the output of which is connected to control circuit 38.

There will now be described the operation of the circuit in FIG. 4, assuming that a reading order is given either by a key of keyboard member 25, or by start button 39. Gate 45 then delivers a start of reading signal to controlling circuit 38. The reproduction of a magazine page, corresponding to the content of scratch pad memory 28, then begins, as indicated in the following Table I:

TABLE I

| NATURE OF INFORMATION | MEMORY BEING READ | METHOD OF READING ADDRESSES |
|---|---|---|
| Fixed element forming the page of text | 28 (fixed content) | Sequential |
| .......................... | ............... | Jump toward an address of read only memory 29 (FIG. 3) |
| Reading one or several parameters | 29 (variable content) | Sequential |
| .......................... | ............... | Jump toward an address of scratch pad memory 28 |
| New fixed elements forming the page of text | 28 (fixed content) | Sequential |
| .......................... | ............... | Jump to an address of read only memory 29 |
| etc. | | |
| Fixed elements at the end of page | 28 | Sequential |

In order for that cycle to proceed, the address counter 37 performs the necessary jumps, so that the unchangeable parts of the magazine, such as format, color, which come out of read only storage is an archive to read only memory 29 are inserted with the information carrying parts such as numbers, titles, etc. which come out of permanent 30. That result is obtained by a system for controlling the address sequence in circuit 38, which decodes the addresses where jumps are necessary, and which then interrupts the sequence of address counter 37 by changing it to a new value, through bus 43. The addresses supplied by counter 37 are transmitted to address register 31 or to interface 32, by way of bus 41, interface 35, conductor 17, the chosen address decoding device 16 (FIG. 2), connector 15 of the module of the selected cassette, address circuit 34 and interface 32 (FIG. 3). In addition, those addresses are transmitted through bus 42 to controlling circuit 38, which decodes them. Once the fixed elements of the end of the page have been read in scratch pad memory 28, the above described cycle constantly repeats itself.

For each address received in address register 31 or in interface 32 from address counter 37, an octet or byte reading is performed, respectively in read only storage or read only memory 29 or permanent memory 30. The corresponding octet is read by way of data bus 33, address circuit 34, data bus 16, address decoder 17, interface 35, data bus 40 and interface 36 which transmits the octet or byte to the ANTIOPE terminal 20, which displays on the screen of TV set 21 (FIG. 1) the entire page of teletext, the displaying lasting as long as necessary.

When the reading order is suspended by means of keyboard 25 or start button 39, controlling member 38 interrupts the cycle in progress and, through connection 46 toward interface 36, causes the memories of ANTIOPE terminal 20 to go back to zero, so as to stop the display.

The result of the addresses and octets or bytes exchange gives the display of a Table II of the following type:

TABLE II

| Tape Index | Identification Order Number | Length L Of Recording Title | Restrictions Code | Access |
|---|---|---|---|---|
| 000 | 1 | X Y Z | E 628 | Free |
| 035 | 2 | A B C | P 333 | Conditional |
| ... | . | ..... | ..... | ...... |
| ... | . | ..... | ..... | ...... |

In this way, the user of the system, according to the invention, has available information regarding the physical characteristics of the tape and its content, an index indicating the footage, the code defining the field of use and the access restrictions indicating that, in order to reach the recording under consideration, it is further necessary to know a password.

In the scratch pad memory embodiment represented in FIG. 5, there is found again the assembly or group or set of the two memories 29 and 30, with register 31 and interface 32. The register and interface are connected to data bus 47 on which there are also connected an interface 48, a central microprocessor unit 49, a program memory 50, and a programmable memory 51. Interface 48 comprises, in order to communicate with data bus 47, a reception or receiver register 52 and an emission or send register 53. Interface 48 is connected to connector 15 through a conditional access circuit 34, as well as by an amplifier 54.

In that embodiment of (FIG. 5), the read only memrory 29, under control of register 31, is read, through data bus 47, by the central microprocessor unit 49. The same is true for the permanent programmable memory 30 which can be re-written, and which is either read or written. The coded question orders which reach connector 15 are received by interface 48; then, with or without conversion, they are stored in receiving register 52 where the central microprocessor unit 49 can come and read them.

Conversely, the central microprocessor unit 49 can send coded response signals toward the emission or send register 53 of interface 48, which sends them toward connector 15 through amplifier 54.

It must be noted that interface 48 can execute a series-parallel conversion at the reception, and a parallel-series conversion at the emission. This makes it possible to limit the number of wires between the connectors 15 and automatic device 18. The transmission of the octets on the data bus between connectors 15 and the automatic device 18 may be synchronous or not, interface 48 being accordingly fitted.

The embodiment in FIG. 5 presents the advantage over that in FIG. 3, since it does not require more than a limited number of question orders between automatic device 18 and the scratch pad memory 28. Indeed, the generating of address sequences can be performed directly by the central microprocessor unit 49, using its program 50.

Indeed, the program of the scratch pad memory microprocessor 49 is written in memory 50 for the managing of read only memory 29 and permanent 30, and it also uses the data written in programmable memory 51. It must be noted that all of the elements in FIG. 5 are mounted on a card 55, similar to 34.

It is obvious that the cell of the cassette magazine only permits the reading of the scratch pad memories 11 it contains.

In FIG. 6, there has been represented a videocassette 11 fitted with its module 14 which comprises the female part of connector 15. The videocassette is assumed to be ready for introduction into the corresponding lodging of magnetic recorder 12. The lodging being assumed to be fitted to receive it with its module and comprising, especially, the male part of connection 15. The role of the circuit connected to the videocassette in service, that is to say, placed in the magnetic recorder, is more complete because it comprises, in addition, the possibility of writing new information and of erasing some old ones, taking into account the video recordings or erasings. Each operation is performed on the video recorder having a content which is similar to the content of the scratch pad memory.

When there is performed a manual recording, that is to say a recording by direct handling on the magnetic recorder (as opposed to an automatic recording made by the already mentioned EPEOS system or by any other automatic system), the sole fact of writing a new sequence on the video tape has as a consequence to modify the summary. The automatic device 18 which is connected to the magnetic recorder reflects that information taking into account the indications it possesses, that it to say the number of different sequences recorded. In that case, its action is limited to renumbering the sequences of the cassette and to establish the new relationship between the numbers of the sequences and the footages of the tape.

When the recording is to cause a use of the EPEOS system, the recording order is given by programmer 24 which then has available additional information which have reached the antenna at the same time as the program to be recorder. The information is:

an emission number pertaining to the EPEOS service, which may be used as a marker by the use,
the title of the emission, and numerous other indications which will progressively be provided for, as a function of the needs:
reception detector
summary of the emission
other information The EPEOS programmer 24 delivers the information to the data bus 17 which is connected in a manner such that they can be used by automatic device 18.

We claim:

1. A scratch pad memory for identifying program material recorded on a magnetic tape in a cassette or cartridge, said program material being recorded or changed responsive to user command; said scratch pad memory comprising address register means; read only storage memory means accessed via said address register means; first interface means, read/write memory means accessed via said interface means, said read/write memory means being rewritable with new information data; teletext terminal means; data bus means for interconnecting said first interface means, said address register means, and said telextext terminal means; television receiver means coupled to display said program material responsive to said stored data and said information data; control circuit means for controlling the read out of said scratch pad memory responsive to addresses delivered from said address register means; and means for causing said address register to jump to predetermined addresses in order to collate data stored in said read only storage memory means, and said read/write memory means.

2. A memory system for controlling a reproduction of video signals stored on a magnetic tape, said memory system comprising a scratch pad memory means for storing new information data relative to each input of program material recorded on said tape, permanent memory means storing fixed data relative to all corresponding units of program material, controller means for controlling the reproduction of said video signal from said tape, address memory means for guiding a read out of information data from said scratch pad memory, and sense for causing said address memory to jump to addresses which compares data taken from said scratch pad memory and said permanent memory.

3. The system of claim 2 and data bus means for interconnecting parts of said memory system and for applying said read out data to a television receiver means which displays said compared material.

4. The system of claim 3 and cassette means for storing said data, and automatic means for reading data from a selected one of said cassettes.

5. The system of claim 4 and keyboard means for entering control information for controlling said memory system.

6. The system of claim 5 and means responsive to videotext data received by said television receiver means for storing said program material on said magnetic tape.

7. The system of claim 2 wherein said information data stored in said scratch pad memory includes an order number identifying said data and restriction information limiting access to said data, and means for giving access to said information data identified by said order number only responsive to the receipt of access signals required by said restriction information.

* * * * *